United States Patent Office 3,489,777
Patented Jan. 13, 1970

3,489,777
PROCESS FOR THE PREPARATION OF EQUI-
LENIN, ITS HOMOLOGUES AND DERIVA-
TIVES, AND INTERMEDIATE PRODUCTS
OBTAINED BY THIS PROCESS
Alain Horeau, Sceaux, and Francoise-Elisabeth Lorthioy,
St.-Gratien, France, assignors to Roussel-Uclaf, Paris,
France, a corporation of France
No Drawing. Filed Nov. 22, 1967, Ser. No. 684,927
Claims priority, application France, Nov. 29, 1966,
85,400
Int. Cl. C07c 167/02, 169/10, 171/07
U.S. Cl. 260—397.45       11 Claims

ABSTRACT OF THE DISCLOSURE

This invention relates to a process for the preparation of an equilenin compound of the formula

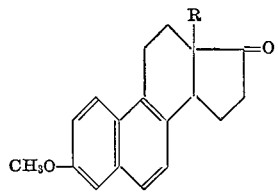

wherein R is lower alkyl, which comprises the steps of (a) condensing the magnesium organic compound of 6-methoxy-2-bromo-naphthalene with an enol ether of 2-R-cyclopentane-1,3-dione, (b) selectively reducing the double bond in the cyclopentene ring of the resulting 1-R-2-(6'-methoxynaphthyl-2') - 5 - oxo-cyclopentene-1 by catalytic hydrogenation, (c) allylating the resulting 1-R-2-(6'-methoxy-naphthyl-2')-5-oxo - cyclopentane by the action of an allylation agent in the presence of 2,2-dimethoxy-propane, (d) oxydizing the resulting 1-R-1-allyl-2-(6'-methoxy-naphthyl-2')-5-oxo-cyclopentane, (e) cyclizing the resulting 1-R-1-carboxymethyl-2-(6'-methoxy-naphthyl-2')-5-oxo-cyclopentane by the action of a concentrated phosphoric agent, (f) reducing the ketone in the 11-position of the resulting 3-methoxy-13-R-$\Delta^{1,3,5(10),6,8}$-gonapentaene-11,17-dione (C–D, trans) by hydrogenolysis and (g) recovering said equilenin compound.

THE PRIOR ART

It is known that the existing syntheses of the natural hormone, equilenin, are generally long and tedious and often have a drawback that they are not very stereospecific.

OBJECTS OF THE INVENTION

An object of the present invention is the development of a process of total synthesis of equilenin and its homologues which has, on one hand, the advantages of speed and high stereospecificity and, on the other hand, makes possible the preparation of equilenin as well as its homologues in the 13-position.

Another advantage of the present process consists in using as intermediate a carboxylic acid, so as to effect by conventional methods an easy resolution into its optical antipodes.

A further object of the present invention is the development of a process for the preparation of an equilenin compound of the formula

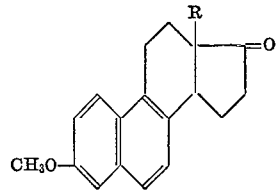

wherein R is lower alkyl, which comprises the steps of (a) condensing the magnesium organic compound of 6-methoxy-2-bromo-naphthalene with an enol ether of 2-R-cyclopentane-1,3-dione, (b) selectively reducing the double bond in the cyclopentene ring of the resulting 1-R-2-(6'-methoxy-naphthyl-2') - 5 - oxo-cyclopentene-1 by catalytic hydrogenation, (c) allylating the resulting 1-R-2-(6'-methoxy-naphthyl-2')-5-oxo-cyclopentane by the action of an allylation agent in the presence of 2,2-dimethoxy-propane, (d) oxydizing the resulting 1-R-1-allyl-2-(6'-methoxy-naphthyl-2')-5-oxo-cyclopentane, (e) cyclizing the resulting 1-R-1-carboxymethyl-2-(6'-methoxy-naphthyl-2')-5-oxo-cyclopentane by the action of a concentrated phosphoric agent, (f) reducing the ketone in the 11-position of the resulting 3-methoxy-13-R-$\Delta^{1,3,5(10)6,8}$-gonapentaene-11,17-dione (C–D, trans) by hydrogenolysis and (g) recovering said equilenin compound.

A still further object of the invention is the obtention of the novel intermediates:

(a) A compound of the formula

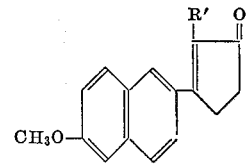

wherein R' is alkyl having from 2 to 7 carbon atoms.

(b) A compound of the formula

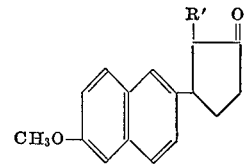

wherein R' is alkyl having from 2 to 7 carbon atoms.

(c) A compound of the formula

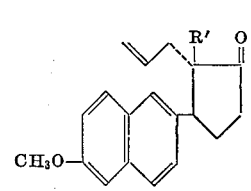

wherein R is lower alkyl and the allyl radical is in the trans configuration relatively to the naphthyl radical.

(d) A compound of the formula

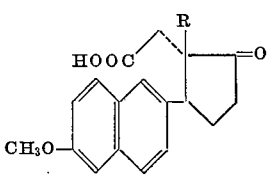

wherein R is lower alkyl and the carboxymethyl radical is in the trans configuration relatively to the naphthyl radical, selected from the group consisting of the racemate and the optically active isomers.

(e) A compound of the formula

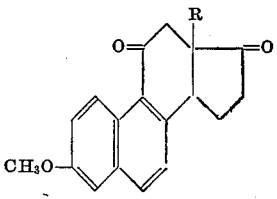

wherein R is lower alkyl and the junction between ring C and D is in the trans configuration, selected from the group consisting of the racemate and the optically active isomers.

(f) A compound of the general formula

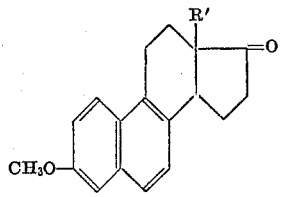

wherein R' is alkyl having from 2 to 7 carbon atoms and the junction between ring C and D is in the trans configuration, selected from the group consisting of the racemate and the optically active isomers.

These and other objects of the invention will become more apparent as the description thereof proceeds.

DESCRIPTION OF THE INVENTION

The process of the invention is illustrated by reference to the following flow diagram showing the sequence of the reactions.

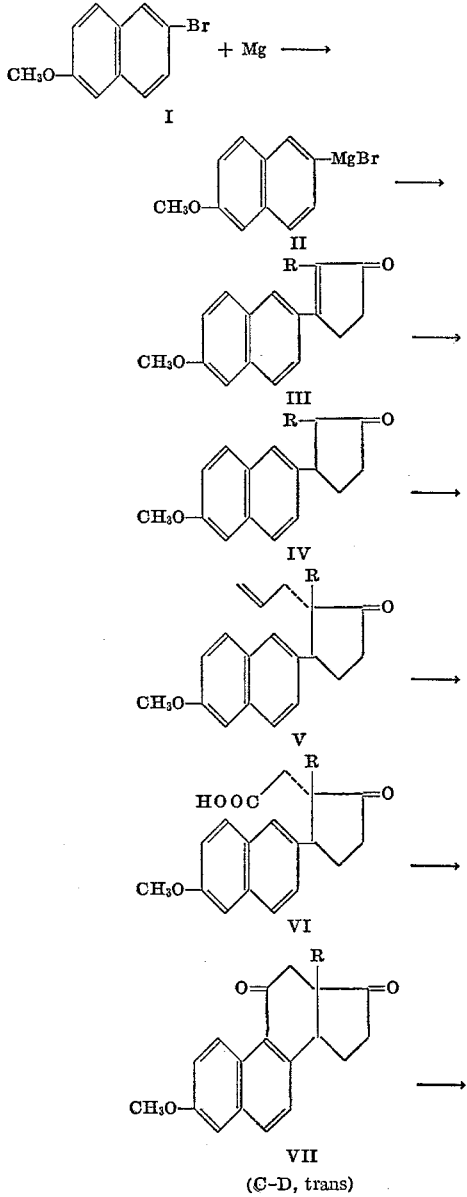

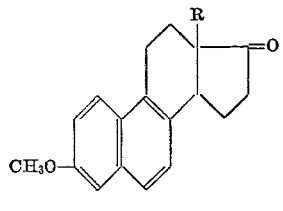

(C–D, trans)

This process is essentially characterized in that the magnesium organic compound of 6-methoxy-2-bromo-naphthalene, II, is condensed with an enol ether of a 2-R-cyclopentane-1,3-dione, R representing here and in the following a lower alkyl radical. A 1-R-2-(6'-methoxy-naphthyl-2')-5-oxo-cyclopentene-1, III, is obtained. The double bond of the future D ring is selectively reduced by catalytic hydrogenation. The reduced product, 1-R-2-(6'-methoxy-naphthyl-2')-5 oxo-cyclopentane, IV, is submitted to the action of an allylation agent, particularly by allyl alcohol, in the presence of 2,2-dimethoxy-propane, so as to obtain 1-R-1-allyl-2-(6'-methoxy-naphthyl-2')-5 oxo-cyclopentane, V, which by oxidation provides 1-R-1-carboxymethyl-2-(6'-methoxy-naphthyl-2')-5 oxo-cyclopentane, VI, which can be resolved by means of an optically active base into its antipodes. The acid, VI, formed is cyclised by the action of a concentrated phosphoric agent to give 3-methoxy-13-R-$\Delta^{1,3,5(10)6,8}$-gonapentaene-11, 17-dione (C–D), trans), VII, the ketone in the 11-position of which is reduced by hydrogenolysis and the desired 3-methoxy-13-R-$\Delta^{1,3,5(10)6,8}$-gonapentaene - 17 - one (C–D), trans), VIII, is obtained.

To obtain the latter compound as the free phenol in the 3-position, it suffices to demethoxylate it according to the methods described by Bachmann et al. J.A.C.S. 61, (1939) p. 974 and J.A.C.S. 62 (1940) p. 824.

The process of the invention defined hereinbefore is based on two unexpected properties:

(1) The stereospecific allylation of 1-R-2-(6'-methoxy-naphthyl-2')-5-oxo-cyclopentane, IV; and (2) The cyclisation of 1-R-1-carboxymethyl-2-(6'-methoxy-naphthyl-2')-5-oxo-cyclopentane, VI.

This latter reaction is all the more surprising as according to recent publications, Russian authors have been unable to cyclise derivatives of similar structure when these contained a ketone function in the future 17-position of the steroid (see for example Maximov et al., Zh. Organ. Khim., 1, 2140 (1965), summarized in Chemical Abstracts, 64, 19, 475d (1966)).

The carrying out of the process of the present invention can be characterized by the following preferred embodiments.

(a) The magnesium organic compound of 6-methoxy-2-bromo-naphthalene, II, is condensed with the isobutyl ether of 2-R-cyclopentane-1,3-dione. The reaction is conducted in a tetrahydrofuran media, and the reaction product is thereafter hydrolysed by an aqueous acid such as sulfuric acid.

(b) The hydrogenation of the double bond in the eventual D ring of 1-R-2-(6'-methoxy-naphthyl-2')-5 oxo-cyclopentene-1 III, is effected in alkaline medium and in the presence of a palladium catalyst.

(c) The allylation of 1-R-2-(6'-methoxy-naphthyl-2')-5 oxo-cyclopentane, IV, is effected by allyl alcohol in the presence of 2,2-dimethoxy-propane, and the reaction is conducted in benzene in the presence of a small amount of a strong acid such as p-toluene sulphonic acid by heating gently at temperatures ranging from 50° to 60° C.

(d) The oxidation of 1-R-1-allyl - 2 - (6'-methoxy-naphthyl-2')-5-oxo-cyclopentane, V, is brought about by action of potassium permanganate in the presence of acetone and water or also by action of a mixture of sodium metaperiodate and potassium permanganate, operating in a mixture of tertiary butyl alcohol and water.

(e) The cyclisation of 1-R-1-carboxymethyl-2-(6'-methoxy-naphthyl-2')-5-oxo-cyclopentane, VI, is effected by a concentrated phosphoric agent such as polyphosphoric acid, phosphoric oxychloride or a mixture of both reagents, preferably by heating to temperatures up to 100° C.

(f) The hydrogenolysis of 3-methoxy-13-R-$\Delta^{1,3,5,(10),6,8}$-gonapentaene-11,17-dione (C–D, trans), VII, is effected by hydrogen in the presence of a palladium catalyst, operating in acetic acid and in presence of a very small amount of perchloric acid.

It is obvious that the mode of operation given above does not possess any limiting characteristics and especially that some elements may be changed.

It will be evident to those skilled in the art that, instead of using 6-methoxy-2-bromo-naphthalene, one may use another ether of naphthalene which is readily cleaved, substitute the bromine by iodine, or use instead of the isobutyl enol ether of the selected 1-lower alkyl-cyclopentane-1,3-dione, another lower alkyl ether of the dione in question. Likewise methods other than those indicated above may be employed so as to oxidise the allyl radical of the compound, V. It is also possible to operate in two steps by conversion of the allyl derivative into a diol by action of osmium tetroxide and an oxidation breakdown of the latter by periodic acid, etc.

In addition, if desired, 1-R-1-carboxymethyl-2-(6'-methoxy-naphthyl-2')-5-oxo-cyclopentane VI can be readily resolved into its optical antipodes by conventional processes utilizing optically-active bases.

The invention is illustrated by a detailed description of the preparation of the methyl ether of dl-equilenin, the compound of Formula VIII, with R=CH₃ by starting from 2-methyl-cyclopentane-1,3-dione. The preparation of the homologues in the 13-position of equilenin by using the corresponding homologues of methyl-cyclopentanedione, as for example 2-ethyl-cyclopentane-1,3-dione or 2-n-propyl-cyclopentane-1,3-dione can be effected in a rigorously analogous manner.

Methyl-cyclopentanedione and its homologues are known compounds and can be prepared by using the processes described in the copending, commonly-assigned U.S. patent application No. 361,877, filed Apr. 22, 1964.

The following example is illustrative of the practice of the invention. It is to be understood, however, that it is not to be deemed limitative in any respect.

EXAMPLE

PREPARATION OF THE METHYL ETHER OF DL-EQUILENIN, VIII WITH R=CH₃

Step A: 1-methyl-2-(6'-methoxy-naphthyl-2')-5-oxo-cyclopentene-1, III with R=CH₃

(1) *Preparation of the isobutyl enol ether of 2-methyl-cyclopentane-1,3-dione.*—20 g. of 2-methyl-cyclopentane-1,3-dione, 29 cc. of isobutanol, 200 cc. of anhydrous benzene and 5.1 g. of anhydrous paratoluene sulphonic acid are placed in a 500 cc. flask having a ground glass neck surmounted by a condenser with a water separator. The mixture is heated to reflux for ten hours. The water formed is separated. The amount collected (3.2 cc.) corresponds to the theorical quantity.

The solution is washed with a 5% sodium bicarbonate solution, with water, with water saturated with sodium chloride, and dried over potassium carbonate. The benzene is driven off under vacuum. There are obtained 30 g. of raw product, which distills at 88° C. to 89° C. under 0.4 to 0.5 mm. of mercury. Distillation provides 26.4 g. of a slightly yellow product, being a yield of 88%.

(2) *Preparation of the magnesium organic compound of 6-methoxy-2-bromo-naphthalene, II.*—1.95 g. (0.08 mol) of magnesium, 25 cc. of anhydrous tetrahydrofuran and an iodine crystal are placed in a 250 cc. three-necked, well-dried flask, equipped with a Mariotte funnel, an agitator, and a condenser surmounted by a guard. A flow of nitrogen is made to pass through the flask. 19 g. (0.08 mol) of 6-methoxy-2-bromo-naphthalene, dissolved in 60 cc. of anhydrous tetrahydrofuran are added drop by drop through the funnel, while shaking. Time of addition is about one hour. At the end of the addition, the solution is heated with reflux for half an hour, then it is left to cool with agitation for two hours.

(3) *Condensation of the magnesium organic compound, II, with the isobutyl enol ether of 2-methyl-cyclopentane-1,3-dione.*—The flask containing the above preparation is placed in ice and the isobutyl enol ether, prepared in (1) above, 13.4 g. (0.08 mol), dissolved in the minimum amount of tetrahydrofuran are added drop by drop. The solution changes from green to brownish red. It is allowed to return to room temperature and is agitated for two hours. It is set aside overnight with agitation under an atmosphere of nitrogen. Thereafter, the solution is heated for one hour with reflux.

(4) *Hydrolysis of the magnesium organic compound.*—The solution from (3) above is poured into a mixture of 75 g. of ice and 4.2 cc. of sulfuric acid. The aqueous phase is extracted with ether and the ethereal solution obtained is washed with a 10% sodium hydroxide solution with water, with a sodium chloride brine, and dried over sodium sulfate. The solvents are driven off under vacuum. 21.4 g. of raw product are obtained.

The raw mixture is dissolved in a mixture of 25 cc. of benzene and 25 cc. of hexane. 5.3 g. of yellow crystals are obtained by vacuum filtering.

Chromatography of the mother liquor through alumina: The mother liquor of the crystallisation is chromatographed through alumina. A mixture of benzenehexane, 1:1, eluates 5.8 g. of ethylenic ketone, III, with R=CH₃.

Both yields are recrystallised from 40 cc. of methanol and furnish 10 g. of 1-methyl-2-(6'-methoxy-naphthyl-2')-5-oxo-cyclopentene-1, III with R=CH₃, having a melting point of 111° C. with a yield of 50%.

Step B: 1-methyl-2-(6'-methoxy-naphthyl-2')-5-oxo-cyclopentane, IV with R=CH₃

4 g. of 1-methyl-2-(6'-methoxy-naphthyl-2')-5-oxo-cyclopentene-1, III with R=CH₃, are dissolved in 200 cc. of ethanol and agitated under an atmosphere of hydrogen in the presence of 6 g. of charcoal containing 5% of palladium and 1 g. of potassium hydroxyde. The theoretical amount of hydrogen is fixed in four hours. After filtration of the catalyst, the solution is neutralized by acetic acid, evaporated, taken up with ether. After filtering, the ether is evaporated; 3.5 g. of raw product are obtained. Recrystallization from the methanol gives 2.3 g. of white crystals of 1-methyl-2-(6'methoxy-naphthyl-2')-5-oxo-cyclopentane, IV with R=CH₃ having a melting point of 87° C. with a yield of 58%.

Step C: 7-methyl-1-allyl-2-(6'-methoxy-naphthyl-2')-5-oxo-cyclopentane, V with R=CH₃

2.5 g. of 1-methyl-2-(6'-methoxy-naphthyl-2')-5-oxo-cyclopentane, IV with R=CH₃, (0.01 mol), 2.9 g.(0.05 mol) of allyl alcohol (B.P.=96° C.), 2.6 g. (0.025 mol) of 2,2-dimethoxy propane (B.P.=79°–80° C.), 20 mg. of para-toluene sulphonic acid and 10 cc. of anhydrous benzene are placed in a small distillation flask. The reaction mixture is gently heated and the distillate constituted by the acetone formed and the azeotrope benzene-methanol is collected between 56° C. and 58° C. When nothing more distills at this temperature, it is further heated and a benzene-allyl alcohol azeotrope, then benzene, are collected as distillates.

2.9 g. of oily raw products are left in the bottom of the distillation flask. Chromatography in vapour phase shows that about 70% of the original ketone have been allylated.

The oil is chromatographed through 90 g. alumina.

(1) A hexane-benzene mixture (4:1) eluates 1.8 g. of allyl ketone, V with R=CH$_3$.

(2) A hexane-benzene mixture (1:1) eluates 0.7 g. of starting ketone, IV, with R=CH$_3$.

The allyl ketone is recrystallized from 5 cc. of methanol. 1.6 g. of pure 1-methyl-1-allyl-2-(6'-methoxy-naphthyl-2')-5-oxo-cyclopentane, V with R=CH$_3$ is obtained. The product occurs as white crystals with a melting point of 90° C. Yield: 55% with respect to the starting product; 80% with respect to the converted ketone.

*Analysis.*—C$_{20}$H$_{22}$O$_2$. molecular weight=294. Calculated: C, 81.6%; H, 7.7%; O, 11.3%. Found: C, 81.6%; H, 7.5%; O, 10.9%.

*I.R. spectrum:* —C=O 1735 cm.$^{-1}$; —CH=CH$_2$ 1635cm.$^{-1}$, 995 cm.$^{-1}$, 915 cm.$^{-1}$; aromatics: 1605 cm.$^{-1}$

*N.M.R. spectrum:* CH$_3$ singlet 0.70 p.p.m.; —O—CH$_3$ singlet 3.88 p.p.m.; 6 naphthalenic protons massive 7 to 7.70 p.p.m.

This compound is not described in the literature.

Step D: 1-methyl-1-carboxymethyl-2-(6'-methoxy-naphthyl-2')-5-oxo-cyclopentane, VI with R=CH$_3$ (A) By oxidation of compound V with potassium permanganate.—1.6 g. of 1-methyl-1-allyl-2-(6'-methoxy-naphthyl-2')-5-oxo-cyclopentane, V with R=CH$_3$ in solution in a mixture of 50 cc. of acetone distilled over potassium permanganate and 10 cc. of water is treated at 0° C. and under agitation with potassium permanganate. 2.6 g. of the oxidizing agent, finely crushed, is introduced into the reaction mixture over a period of five hours, in small portions quarter-hourly. With each addition of potassium permanganate, ammonium sulfate is also introduced. (3 g. are introduced all together.)

The mixture is agitated overnight at room temperature. The precipitate formed is vacuum filtered and washed with a 10% sodium hydroxide solution. The aqueous phase is treated with hydrochloric acid and extracted with ether. In this way, after evaporation, 0.890 g. of the raw acid are obtained.

(I) Purification of the acid through its methyl ester: The raw acid (890 mg.) is treated by diazo-methane and the ester obtained is chromatographed through 30 g. of alumina. On eluation, the following fractions were obtained:

|  | Mg. |
|---|---|
| (1) Cyclohexane-benzene 1:1 | 440 |
| (2) Benzene | 90 |
| (3) Methanol | 95 |

The fraction (1) represents the methyl ester, 1-methyl-1-carbomethoxymethyl - 2 - (6' - methoxy-naphthyl-2')-5-oxo-cyclopentane, VI with R=CH$_3$.

*Analysis of the ester.*—C$_{20}$H$_{25}$O$_4$; molecular weight=326. Calculated: C, 73.6%; H, 6.8%. Found: C, 72.9%; H, 6.9%.

*Analysis of the 2-4 dinitrophenylhydrazone.*—C$_{26}$H$_{26}$N$_4$O$_7$. Calculated: C, 61.65%; H, 5.17%; N, 11.05%. Found: C, 61.8%; H, 5.3%; N, 10.9%.

*I.R. spectrum.*—(CHCl$_3$) —C=O, ketone and ester not separated: 1730 cm.$^{-1}$; —OCH$_3$: 1030–1040 cm.$^{-1}$; naphthalene: 1635 cm.$^{-1}$, 1600 cm.$^{-1}$, 1500 cm.$^{-1}$.

Saponification of the ester: The fraction (1) is treated at reflux at 90° C. for one hour with 20 cc. of methyl alcohol and 0.3 cc. of a caustic soda solution. The solution is taken up with 30 cc. of water and extracted with ether. The aqueous phase is acidified with hydrochloric acid and extracted with ether. The ethereal phase is washed with water and the solvent is eliminated. 410 mg. of acid are obtained (yield: 25% with respect to the starting ketone. (Yield: 50% with respect to the acid fraction.) This acid is recrystallized from methanol and white crystals of 1-methyl-1-carboxymethyl-2-(6'-methoxy-naphthyl - 2') - 5-oxo-cyclopentane, VI with R=CH$_3$, are obtained having a melting point of 154° C.

*Analysis.*—C$_{19}$H$_{20}$O$_4$; molecular weight=312. Calculated: C, 73.5%; H, 6.45%. Found: C, 72.5%; H, 6.35%.

(II) Direct chromatography of the acid VI through silica: The acid fraction of Step D can also be chromatographed directly through silica. 1.1 g. of the acid fraction (obtained from 2.4 g. of starting compound V with R=CH$_3$ are allowed to pass through 15 g. of silica+5 g. of absorbing clay.

On eluating with a benzene-hexane mixture (4:1), 600 mg. of 1-methyl-1-carboxymethyl-2-(6' - methoxy - naphthyl-2')-5-oxo-cyclopentane, VI with R=CH$_3$, are obtained, being a yield of 25%.

(B) By oxidation of compound V with a mixture of sodium metaperiodate and potassium permanganate.— 1 g. of 1-methyl-1-allyl-2-(6'-methoxy - naphthyl-2')-5-oxo-cyclopentane, V with R=CH$_3$, is brought into solution in 136 cc. of tertiary butyl alcohol. A solution of 1 g. of potassium carbonate in 34 cc. of water is added, then a solution of 6.8 g. of sodium metaperiodate in 85 cc. of water, finally 34 cc. of a 0.8% solution of potassium permanganate. The mixture is agitated overnight. The tertiary butanol and a little water are distilled off under vacuum. The remaining solution is extracted with ether. The aqueous phase is treated with 45 cc. of a 50% solution of sulphuric acid, then extracted with ether. After drying and distilling the solvent, the acid fraction is recrystallized from methanol. A 20% yield of 1-methyl-1-carboxymethyl-2-(6'-methoxy-naphthyl-2')-5 - oxo - cyclopentane, VI with R=CH$_3$, is obtained.

The compound VI is not described in the literature.

Step E: Methyl ether of dl-11-oxo-equilenin, VII with R=CH$_3$ 7 cc. of polyphosphoric acid and 220 mg. of 1-methyl-1-carboxymethyl-2(6'-methoxy-naphthyl - 2')-5-oxo - cyclopentane, VI with R=CH$_3$, are placed in a small ground flask equipped with a potassium hydroxide guard. The reaction mixture is heated for one hour at 100° C.

Water is added to the reaction mixture and the solution is neutralized with sodium carbonate. It is extracted with ether and benzene. The ether and benzene extracts are washed with a solution saturated with sodium carbonate and with water, and dried over sodium sulfate. After distilling the solvents, there are obtained 190 mg. of a raw product, which is crystallized from ethyl acetate and supplies 95 mg. of pale yellow crystals of the methyl ether of dl-11-oxo-equilenin, VII with R=CH$_3$, having a melting point of 220° C. with a yield of 50%.

An analytical sample, recrystallized from ethyl acetate has a melting point of 224° C.

*Analysis.*—C$_{19}$H$_{18}$O$_3$; molecular weight=294. Calculated: C, 77.8%; H, 6.0%. Found: C, 77.5%; H, 6.2%.

*I.R. spectrum.*—(KBr) C=O (of the cyclopentane) 1740 cm.$^{-1}$; C=O (conjugated) 1670 cm.$^{-1}$.

*N.M.R. spectrum.*—Angular CH$_3$: 0.85 p.p.m. (singlet); OCH$_3$: 3.88 p.p.m. singlet; massive naphthalene: 7 to 7.7 p.p.m. This compound is not described in the literature.

Step F: Methyl ether of dl-equilenin, VIII with R=CH$_3$ 100 mg. of methyl ether of dl-11-oxo-equilenin, VII with R=CH$_3$, are dissolved in 10 cc. of acetic acid. One drop of perchloric acid and 100 mg. of charcoal containing 5% palladium are added. The whole is agitated under a hydrogen atmosphere for two hours and a half. The theoretical amount of hydrogen (16 cc.) is fixed. The solution is filtered, neutralized with sodium hydroxide and extracted with ether. The ether extracts are washed and dried. After evaporation, 90 mg. of the methyl ether of raw equilenin are obtained. A first recrystallization from 15 cc. of methanol gives 30 mg. of the methyl ether of dl-equilenin, VIII with R=CH$_3$, having a melting point of 186° C.

*I.R. spectrum:* —C=O: 1725 cm.$^{-1}$; —OCH$_3$: 1040–1060 cm.$^{-1}$; naphthalene 1615, 1595, 1500, 855, 820, 790 cm.$^{-1}$.

*N.M.R. spectrum:* Angular CH$_3$: 0.80 p.p.m. singlet; OCH$_3$: 3.84 p.p.m. singlet; naphthalene: massive 7 to 8 p.p.m.; 1 peak at 2.24 p.p.m. not identified.

*Analysis.*—C$_{19}$H$_{20}$O$_2$; molecular weight=280. Calculated: C, 81.4%; H, 7.2%; O, 11.4%. Found: C, 81.3%; H, 7.3%; O, 11.4%.

The preparative chromatography on plate of the mother liquor gives 35 mg. of the 3-methyl ether of dl-equilenin. Yield: 70%.

The preceding specific embodiment is illustrative of the practice of the invention. It is obvious, however, that other expedients known in the art, such as discussed above and such as use of other homologs of 2-lower alkyl-cyclopentane-1,3-dione to prepare homologs of compound VIII where R is lower alkyl other than methyl, or to resolve compound VI by known processes to prepare compound VIII in either the levoratatory or dextrorotatory enantiomorphs, can be employed without departing from the spirit of the invention.

We claim:

1. A process for the preparation of an equilenin compound of the formula

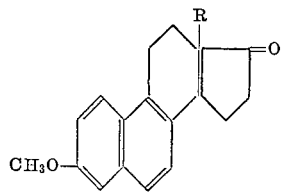

wherein R is lower alkyl, which comprises the steps of (a) condensing the magnesium organic compound of 6-methoxy-2-bromo-naphthalene with an enol ether of 2-R-cyclopentane-1,3-dione, (b) selectively reducing the double bond in the cyclopentene ring of the resulting 1-R-2-(6'-methoxynaphthyl-2')-5-oxo-cyclopentene-1 by catalytic hydrogenation, (c) allylating the resulting 1-R-2-(6'-methoxy-naphthyl-2')-5-oxo-cyclopentane by the action of an allylation agent in the presence of 2,2-dimethoxy-propane, (d) oxydizing the resulting 1-R-1-allyl-2-(6'-methoxy-naphthyl-2')-5-oxo-cyclopentane, (e) cyclizing the resulting 1-R-1-carboxymethyl-2(6'-methoxy-naphthyl-2')-5-oxo-cyclopentane by the action of a concentrated phosphoric agent, (f) reducing the ketone in the 11-position of the resulting 3-methoxy-13-R-$\Delta^{1,3,5(10),6,8}$-gonapentaene-11,17-dione (C–D, trans) by hydrogenolysis and (g) recovering said equilenin compound.

2. The process of claim 1, step (a), wherein said enol ether of 2-R-cyclopentane-1,3-dione is the isobutyl enol ether of 2-R-cyclopentane-1,3-dione and the reaction is conducted in tetrahydrofuran.

3. The process of claim 1, step (b), wherein said catalytic hydrogenation is effected in the presence of a palladium catalyst in an alkaline medium.

4. The process of claim 1, step (c), wherein said allylation agent is allyl alcohol and the reaction is conducted at temperatures of from 50° C. to 60° C. in an inert organic solvent in the presence of a small amount of p-toluene sulfonic acid.

5. The process of claim 1, step (d), wherein said oxidizing step is conducted by the action of an oxidizing agent selected from the group consisting of potassium permanganate in the presence of acetone and water, and a mixture of sodium metaperiodate and potassium permanganate in the presence of tertiary butanol and water.

6. The process of claim 1, step (e), wherein said concentrated phosphoric agent is selected from the group consisting of polyphosphoric acid, phosphoric oxychloride and mixtures thereof.

7. The process of claim 1, step (f), wherein said hydrogenolysis is effected with hydrogen in the presence of a palladium catalyst in an acidic medium.

8. The process of claim 1, step (a), wherein said enol ether of 2-R-cyclopentane-1,3-dione is an enol ether of 2-methyl-cyclopentane-1,3-dione.

9. A compound of the formula

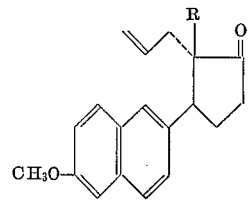

wherein R is lower alkyl and the allyl radical is in the trans configuration relatively to the naphthyl radical.

10. A compound of the formula

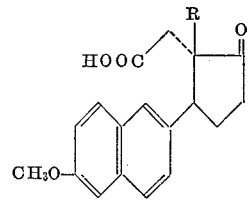

wherein R is lower alkyl and the carboxymethyl radical is in the trans configuration relatively to the naphthyl radical, selected from the group consisting of the racemate and the optically active isomers.

11. A compound of formula

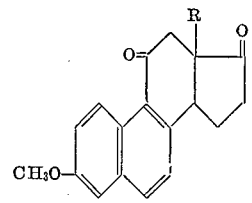

wherein R is lower alkyl and the junction between ring C and D is in the trans configuration, selected from the group consisting of the racemate and the optically active isomers.

References Cited

Coombs: Jour. of Chem. Soc. (10), pp. 955 and 956.

HENRY A. FRENCH, Primary Examiner

U.S. Cl. X.R.

260—520, 590, 999